US 8,321,668 B2

(12) United States Patent
Leroy et al.

(10) Patent No.: US 8,321,668 B2
(45) Date of Patent: Nov. 27, 2012

(54) CONTROL OF DATA ACCESS BY DYNAMICALLY VERIFYING LEGAL REFERENCES

(75) Inventors: Xavier Leroy, Versailles (FR); Patrice Hameau, Boulogne Billancourt (FR); Nicolas Regnault, Paris (FR); Renaud Marlet, Paris (FR)

(73) Assignee: Trusted Logic, Versailles (FR)

( * ) Notice: Subject to any disclaimer, the term of this patent is extended or adjusted under 35 U.S.C. 154(b) by 1358 days.

(21) Appl. No.: 10/585,097

(22) PCT Filed: Dec. 16, 2004

(86) PCT No.: PCT/FR2004/003275
§ 371 (c)(1),
(2), (4) Date: Jun. 30, 2006

(87) PCT Pub. No.: WO2005/073827
PCT Pub. Date: Aug. 11, 2005

(65) Prior Publication Data
US 2007/0168313 A1    Jul. 19, 2007

(30) Foreign Application Priority Data
Dec. 30, 2003 (FR) ...................................... 03 15545

(51) Int. Cl.
*H04L 29/06* (2006.01)
(52) U.S. Cl. ................ 713/167; 726/2; 726/26; 726/27; 717/146; 717/147; 717/148; 717/168
(58) Field of Classification Search .................... 713/167
See application file for complete search history.

(56) References Cited

U.S. PATENT DOCUMENTS

| | | | |
|---|---|---|---|
| 6,151,688 A * | 11/2000 | Wipfel et al. ................... 714/48 |
| 6,560,774 B1 * | 5/2003 | Gordon et al. ................ 717/146 |
| 6,633,984 B2 * | 10/2003 | Susser et al. ..................... 726/21 |
| 6,656,573 B2 * | 12/2003 | Chen et al. ................. 428/195.1 |
| 6,658,573 B1 * | 12/2003 | Bischof et al. .................. 726/16 |
| 6,807,636 B2 * | 10/2004 | Hartman et al. ................ 726/14 |
| 6,922,835 B1 * | 7/2005 | Susser et al. .................... 719/316 |
| 7,117,284 B2 * | 10/2006 | Watt et al. ..................... 710/261 |
| 7,127,605 B1 * | 10/2006 | Montgomery et al. ....... 713/150 |
| 7,140,549 B2 * | 11/2006 | de Jong ......................... 235/492 |
| 7,149,862 B2 * | 12/2006 | Tune et al. ..................... 711/163 |
| 7,171,539 B2 * | 1/2007 | Mansell et al. ............... 711/203 |
| 7,263,717 B1 * | 8/2007 | Boydstun et al. ................. 726/4 |
| 7,305,534 B2 * | 12/2007 | Watt et al. ..................... 711/163 |
| 7,305,712 B2 * | 12/2007 | Watt et al. ....................... 726/30 |
| 7,350,226 B2 * | 3/2008 | Moriconi et al. ................. 726/1 |
| 2003/0120593 A1 * | 6/2003 | Bansal et al. ................... 705/39 |
| 2005/0044197 A1 * | 2/2005 | Lai .............................. 709/223 |

FOREIGN PATENT DOCUMENTS

WO    WO 00/45262 A2    8/2000

OTHER PUBLICATIONS

Bertino, Elisa. Data Hiding and Security in Object-Oriented Databases. Eighth International Conference on Data Engineering. Pub. Date: Feb. 1992. Relevant pp. 338-347. Found on the World Wide Web at: http://ieeexplore.ieee.org/stamp/stamp.jsp?tp=&arnumber=213176.*

* cited by examiner

*Primary Examiner* — Nathan Flynn
*Assistant Examiner* — Jeremiah Avery
(74) *Attorney, Agent, or Firm* — Browdy and Neimark, PLLC

(57) ABSTRACT

The inventive method for controlling access to data which is used by reference in a program execution system (including processes and aims) during the program execution consists in memorising by the system the totality of references obtainable by said program with the aid of means considered legal, before any operation which can be prohibited if it relates to values which are not legal references, in verifying by the system whether said values are amongst the legal references memorized for the program and in accepting or rejecting the operation, respectively.

17 Claims, No Drawings

CONTROL OF DATA ACCESS BY DYNAMICALLY VERIFYING LEGAL REFERENCES

BACKGROUND OF THE INVENTION

1. Field of the Invention

The present invention relates to a method for controlling access to data handled by references in a secured computer system.

2. Description of the Prior Art

It is known that one of the main features of secured computer systems whether they are distributed or not, is control of access to software resources of the system, and notably to programs and data. In particular, when several programs are being executed in the system simultaneously (or alternately), one wants to be sure that execution of one of them does not affect the execution of the other ones, or that of the system: they are isolated.

More generally, it is possible to let certain programs interact with each other, but exclusively within the framework of a strict policy for controlled data sharing. One is thereby protected not only against propagation of unintentional programming errors, but also and especially against malevolent actions (also called "attacks") which aim at tampering with proper operation of the system and the programs or at disclosing confidential information.

By program, it is meant here not only the executable code, i.e., a sequence of instructions, but also the process (or task), i.e., the executing code, with its specific environment consisting of the data which are specific to it as well as resources which have been assigned to it. By data, it is meant both the values handled by a program and the memory areas where values are put away. Depending on the systems (operating systems, runtime environments, virtual machines, etc.), the data belong to the program which created them or more generally to a group of programs which have rights for accessing these data. These rights may be given to other programs for selected particular operations; such data are said to be shareable.

For example, in the Java Card (registered trade mark of Sun Microsystems) language, the programs are organized in packages inside which data sharing (objects and tables) is free. On the other hand, access to data which belong to another package is limited by two devices: a mechanism for requesting access and a "firewall" mechanism. Indeed, in order to access a datum which one does not own, it is necessary to form the request to the package which owns it, a request which it may accept or refuse. Moreover, the firewall filters out all the operations that may be performed on a datum, regardless of the means by which it was obtained. In particular, any reading or writing operation on an object from another package is forbidden, except for calling a method (program routine) explicitly declared by this package as being shareable. There are also objects of the system (i.e., of the "Java Card Runtime Environment", or JCRE) which are accessible (without any particular access rights) by any program.

The data of a program and in particular the complex data (structures, objects, tables, etc.) are generally identified by a reference. It is via a reference that the associated datum as well as the components of this datum (fields of structures and objects, table elements, methods, etc.) may be handled, i.e., read, written, called. The reference itself may be stored, received, and transmitted.

A reference is often a pointer or handle. A pointer is the address where a datum is put away in the memory. A handle is an index in a table of pointers (and more generally in a table of references). The values of pointers and handles also sometimes include specific bits which give information on the datum (for example on the referenced memory area or on the information therein) or, in the case of handles, on the associated table.

Three major attributes concern the "correction" of references:

A reference may be valid or invalid. A valid reference is a reference actually associated with a datum of a program. An invalid reference is a value stored or utilized as reference but which is not associated with a datum. For example in the C language, a pointer towards a data structure is valid; on the other hand, a pointer to the element of a table with index −1 is invalid. The validity of a reference is intrinsic; it does not depend on the agent (program, process, task, etc.) which handles it.

A reference may also be licit or illicit for a given agent of the system. A licit reference is a reference which was obtained by licit means. An illicit reference is a reference which was not obtained by licit means. The actual definition of what is a licit or illicit reference depends on the system, on the programming language and possibly on the context. For example, in the C language, pointer arithmetic (making a pointer by adding a pointer and an integer) is licit; on the other hand it is illicit in Java. A reference is not intrinsically licit or illicit: it is a property specific to an agent, which depends on how the reference was obtained by this agent.

A reference may also be "dereferenceable" or "undereferenceable" by a given agent. A reference which is dereferenceable by an agent is a reference to a datum for which the agent has rights of access. A reference which is undereferenceable by an agent is a reference to a datum for which the agent has no rights of access. For example, in Java Card, an applet which has a reference to an object, may access a field of this object (or an element, if the object is a table) provided that the object belongs to the same package as this applet. On the other hand, if the object belongs to another package (also different from JCRE), any access attempt is stopped by a firewall mechanism and results in an exception being raised (of the "SecurityException" class). A reference is therefore not intrinsically dereferenceable or undereferenceable: it is a property specific to the agent which has the reference and to the access rights which it has on the referenced datum or not.

It should be noted that these are three independent notions.

Thus, a reference may be invalid and licit; this is the case for example in a language like C when one accesses the elements of a table by pointer arithmetic and when the limits of the table are exceeded. A reference may also be valid and illicit: this is the case for example for references made from known references, within the framework of an attack, in order to access protected data to which one should not have access. Finally, a reference may also be both invalid and illicit; this for example is the case of references made within the framework of an attack for deleting the data of the program by systematic and "blind" scanning of the memory.

Moreover, a reference may be dereferenceable or not whether it is valid or invalid, licit or illicit. Thus, access to a protected memory area whether the references are valid or not, may be controlled by rights. On the other hand, reference to a datum on which one has access rights, may be obtained by illicit means; for example, it may be completely made up from scratch instead of requesting it from the system. Conversely, reference to a datum on which one does not have any access rights, may be obtained by licit means, for example for transmitting this reference to another agent which itself has the suitable access rights.

More specifically, the object of the invention is to control illicit references, the questions of validity and "dereferenceability" may also be dealt with elsewhere by means of mechanisms which are specific to these notions.

Generally, access to a structured datum occurs in two phases. First of all a reference must be obtained on the datum. One may then operate on the datum via its reference, i.e., read or write into the components (objects or structure fields, table elements, etc.) of the referenced datum, or call one of its routines.

There are three main means for obtaining references:

A licit means for obtaining a reference is to obtain it from the system or from another program. For example, in Java and in Java Card, the references are created by the system upon allocating new data areas in memory. These references may be provided and obtained by one of the following means: reading and writing into public fields of objects or classes, arguments for calls and return value from methods, raising and remedying exceptions. In Java Card, access to a public field of an object belonging to another package, is however forbidden by the firewall. Moreover, reference to a shareable datum belonging to the system or to another package may be requested at the system;

A reference may also be made from another one. For example, in the C language, adding or subtracting an integer to/from a pointer makes a new pointer. The resulting pointer is licit because pointer arithmetic is licit. But it is either valid or not according to the datum referenced by the initial pointer (a pointer inside a table or a structure). In languages other than C, the resulting pointer may not be licit. This is the case for Java and Java Card languages, whether this is at the level of the source code or of the object code intended to be executed in a virtual machine.

Finally, a reference may also be made from scratch. A simple integer may thus be considered as a pointer or a handle after assignment of a reference type. The resulting reference may be valid or invalid. On the other hand it is generally considered as illicit, as for example in Java and Java Card. Such a reference may however be considered as licit in contexts and for particular languages. This is the case in the C language when one accesses input/output ports installed at determined memory addresses.

Two commonly used steps for access control correspond to the two phases for accessing the datum (obtaining a reference, and then operating on the associated datum via the reference):

On the one hand, counterfeit of references needs to be prevented. In other words, a program should not be able to make a reference and pretend to have obtained it by licit means. As indicated above, the meaning of "licit means" varies according to the systems, the contexts, and the programming languages used. For example, differently from the C language, which allows arithmetic operations to be performed on pointers, the Java and Java Card languages have a data typing system with which operations cannot be performed on references nor can new ones be made from scratch. The only references which a program may legitimately have, in Java or Java Card, are those provided to it by the system (including the virtual machine) or another program, and which it has possibly stored. Counterfeit of references is therefore functionally impossible with well typed programs.

Counterfeit is however possible at the level of a virtual Java or Java Card machine if it does not check type, whether it is static or dynamic (see below). Even in the case of checking, it is always possible to create illicit references by injecting hardware-level defects (electronic bombardment, changes in the electrical power supply, etc.), for example within the framework of an attack against a chip card.

On the other hand, the system must filter out any operation on the references. In other words, the program should not be able to directly perform a reading or writing operation on referenced data; it should pass via the system, which may accept or refuse the operation, according to the requesting program and the referenced data (notably of their owner). For example, differently from machine language instructions, which allow direct and immediate access to any referenced datum, the instructions of the Java Card virtual machine (JCVM) routinely check conditions for accessing data before accepting it or refusing it; this the firewall mechanism of JCRE. This control also includes access to the elements of a table: the system checks whether the index of the elements which are accessed remains within licit limits, given the size of the table.

None of these two steps, taken individually, is generally sufficient for securing a system; security is based on their combination. In fact, the types of protection provided by each of both of these steps partially overlap and complement each other:

Thus preventing counterfeit of references guarantees that a program only handles licit references. All the same, access to all the data corresponding to licit references is not however allowed; the additional presence of a firewall provides restriction of the operations which a program may perform on references, regardless of whether they were obtained by licit or illicit means.

However, a firewall which controls all the operations on the references is not sufficient for guaranteeing the security of a data access policy; it may be tricked by counterfeited references. For example this is possible if the implementation represents references by direct pointers to memory blocks. Indeed, in this model, the data descriptors (i.e., owner, chip, class, type and table size information, used upon checking the access right) are stored in memory at fixed displacements relatively to the pointers. It is sufficient for an ill-intentioned program to counterfeit a pointer in the middle of a data block, for example in the middle of a suitably filled byte table, in order to break the integrity of the memory: with such an attack, it is actually possible to have the system believe that the datum associated with the pointer not only belongs to the program and is therefore accessible, but also that the memory area of this datum is of an arbitrarily large extent, which allows reading or writing from/to any memory cell. Thus, controlling the operations on references does not prevent the making and the use of a reference which has not been obtained by licit means; an illicit access to a datum is therefore possible in spite of the firewall.

The problem of banning counterfeit of references is generally solved in two ways: by static checking based on a program analysis or by dynamic checking of the types of values:

Static checking by program analysis statically checks (once and for all, before any execution) that the program cannot itself make references on data. In other words, a reference cannot be the result of an arbitrary computation of the program. In the case of a language such as Java or Java Card, this type checking may be performed both at source program level (typically upon compiling) and at the level of object programs which may be executed by a virtual machine (typically, upon loading the program into the system or before its execution), by means of a "byte code verifier".

Dynamic checking of the types of value causes the values handled by the program to be marked with their type (integer, reference, etc.). It is then dynamically checked (during execution) that only the values marked as actually being references are used in the operations which deal with references. Marking is not necessarily explicitly associated with the values; it may deal with areas for storing the values and be limited to only certain areas. For example, in the case of the Java or Java Card virtual machine, it is sufficient to dynamically type the stack of operands and local variables. On the other hand, the values stored in tables in static fields or in instance fields do not need to be explicitly marked with their type, as this type may again be found from other information (class of the object, type of the table) available elsewhere. This approach, a so-called "typed stack" approach, prevents pointer counterfeiting as this allows the virtual machine to detect and to prevent all attempts of converting an integer into a reference, as well as arithmetic operations on the references. A Java or Java Card value which has the reference type is thus always a reference to a well formed memory block of the system, containing proper owner, class, and size information.

These solutions are not redundant or exclusive: they correspond to needs or to different means:

Thus, static checking by program analysis may be difficult to implement in small onboard systems such as chip cards, which have little memory and for which the execution rate is low. However, it has the advantage of reporting a problem as soon as possible. A program may for example have been rejected upon its loading in the system. (Checking may also take place outside the executing system and an unforgeable signature may be appended on valid programs).

As far as it is concerned, dynamic checking of the value types has the disadvantage of using a little memory (type marking added to the values or to certain storage areas) and above all of being costly in execution time (allocating and checking the markings). However, it has the advantage of being robust; if a program has successfully been loaded into the system, even by indirect means, it will not be able to perform illicit operations in any case. This is also an additional guarantee against hardware attacks (as opposed to software attacks). For example, even confined in a secured enclosure, like that of a chip card, execution of programs may nevertheless be perturbed by acting on the hardware (changes in the electric power supply, bombardment by radiations, destructions of logic gates, etc.). Dynamic checking is then a means for regularly checking, at each sensitive operation, that the access control policy is properly observed.

These partly or entirely implemented solutions may be combined in order to find better compromises for efficiency or provide the best guarantee as possible.

Another approach, which only partly solves the problem related to counterfeiting of references, consists of checking that every value used as a reference, actually is a reference known from the system. This dynamic checking of the validity of the references does not prevent the making of references. However, it prevents the use of references which in fact are not references. In other words, only the values which actually are references may be used as such by the program.

Implementation of dynamic checking of the validity of the references strongly depends on how the references in the system are represented and managed. For example, a memory manager, which may be requested to create a new data area or else its freeing, exactly knows which references were created. It is therefore possible to know if an integer corresponds or not to an existing valid reference. In the case when the references are represented by pointers, this operation is however costly as it may require extensive browsing through the data structures of the memory manager. On the other hand, if the references are represented by handles, checking is much easier and especially faster: it is sufficient to check that the integer is less than or equal to the maximum index of the table of handles of the memory manager, and that the associated entry in the table does not correspond to data which have been freed.

In the same way as both checks described above (static checking by program analysis and dynamic checking of the value types), dynamic checking of the validity of the references is a protection against attacks which make pointers to false data descriptors (attack described above). Indeed, these counterfeited pointers are not recognized by the system as existing valid references and the access operations are rejected straightaway. However, this type of checking does not guarantee that the program has obtained all the references which it uses, by licit means. An agent may notably make and use a valid and dereferenceable reference (reference to a datum on which it has access rights, for example a shareable datum belonging to another program) without it however having been obtained by licit means.

OBJECT OF THE INVENTION

More specifically, the object of the invention is therefore to solve the aforementioned problems.

SUMMARY OF THE INVENTION

For this purpose, it proposes a form of dynamic checking which deals with the counterfeit of references and which, in a certain way, completes the dynamic checking of the validity of the references in order to cover the cases of using illicit references.

DESCRIPTION OF THE PREFERRED EMBODIMENTS

According to the invention, this dynamic checking of licit references consists, during executing a program, of:
  storing the whole of the references to data which the program obtains by licit means,
  checking, before any operation intended to be forbidden if it deals with the value which is not a licit reference, that the value is among the licit references which have been stored for this program.

In this method, the references may consist of pointers or handles.

The licit means for a program in order to obtain reference values may comprise at least one of the following operations:
  reading a variable or a datum belonging to the system or to another program,
  writing into a variable or datum of said program by the system or by another program,
  receiving arguments on calling from a routine of said program by the system or by another program, utilization of the return value from the call by said program of a routine belonging to the system or to another program, catching up by said program a raised exception during the execution of a routine belonging to the system or to another program, receiving an interruption or a valuated signal by said program.

The system may have a mechanism for determining whether a given data is a valid reference, the stored licit references being limited to the sole references on data, considered as sensitive by the system.

The aforesaid checks may consist of checking that the values are among the sensitive licit references which have been stored for this program or else which are references determined as being valid and dealing with data which are not sensitive.

Advantageously, the system may have a mechanism (a so-called firewall mechanism) which forbids certain operations by certain programs on certain referenced data. In this case, the data considered as being sensitive for the system may consist of data for which operations are not forbidden by the firewall.

Also, the firewall may forbid certain operations by a program on data belonging to other programs or to the system, except on those declared as shareable.

The system for executing programs, applied by the method according to the invention may be based on a Java Card virtual machine and in this case:

the executed program executed by the system may consist of the whole code which is found in a Java Card package, the firewall mechanism may consist of the one from the "Java Runtime Environment" (JCRE), data declared as shareable (and therefore sensitive) may consist of the objects which are instances of classes which implement the "javacard.framework.Shareable" interface when said package calls a method from another package or from the system (including the "getApplet-ShareableInterfaceObject" method of the package "javacard.framework.JCSystem)", reading a public static field of the "javacard.framework.Shareable" type in another package or in the system, catching up an instance object of a class from (inheriting from) "java.lang.Throwable" and implementing "javacard.framework.Shareable".

In the method described earlier, the whole of the licit (or sensitive licit) stored references may be represented by a table.

It may be emptied by means of a garbage collector, of the references which have become inactive (i.e. corresponding to deleted data of the program or unusable for future access in the following of the execution), this garbage collector may be conservative.

The references may be represented in the system by handles and tables of pointers (or of references), some of these tables being possibly reserved for licit (or sensitive licit) references.

The sets of licit (or sensitive licit) stored references may be represented by vectors (or matrices) of bits associated with some of the tables of pointers (or references) where a bit, at a given index, represents the presence or the absence of the corresponding reference in said sets.

The vectors of bits may possibly be hollow and represented by means of a sequence of indexes or lengths corresponding to the extents of bits positioned in the same way (either 1 or 0).

In the same way as the dynamic checking of validity of the references, the mechanism applied by the method according to the invention does not prevent counterfeit of references. However, it prevents access to data via references which cannot be obtained by licit means. Now what is important is the control; whether the reference was made from scratch is practically unimportant as long as it is licit.

For example, if the program builds an integer and attempts to use it as a reference, either this integer does not correspond to a reference present in the whole of stored licit references for this program and the operation is rejected, or this integer corresponds to a reference already present in the whole of the stored licit references for this program and therefore only allows licit accesses to be performed. The attack from a malevolent program attempting to make a reference towards a shareable datum thus becomes uninteresting as the program can only access this datum if it was anyhow able to obtain this same reference beforehand, via licit means.

This mechanism may be improved in different ways:

on the one hand, it is possible to limit the references to be stored to those which are important for the security policy of the system and to limit control to the sole operations which one wants to be forbidden when they deal with illicit references;

on the other hand, according to the mode of representation of the references, it is possible to apply more or less effective implementations of the sets of stored licit references.

Improvements, the goal of which is to consume less memory space and less execution time, may be combined and will be described hereafter as non-limiting examples.

Dynamic checking of sensitive licit references:

Access to data is sometimes partitioned within a same program. For example, in Java as in Java Card, certain fields of a class may be declared as private and thus only be accessible from methods of this class. However, this accessibility control often corresponds to more than software engineering motivations than to a concern of security. What is actually important in Java Card is the partitioning between data of different programs as in some sort of way, programs "do not trust each other". On the other hand, inside a same program, it is not very important to restrict the possible accesses. For example, even if a reference to a datum of the program is stored in a private field, and if this same program in any way makes a copy of this reference without reading this same private field and uses it for accessing the datum, the security of the program and its data is not endangered.

With this note, it is possible to define a first enhancement of the mechanism for dynamically checking licit references by limiting the stored and controlled references. This enhancement is defined in the following way:

on the one hand, during execution only the whole of the references to sensitive data which are obtained by a program by licit means, is stored. It is the context or the type of system which determines the data which may be considered as "sensitive". For example, in the case of Java Card, only data which belong to other programs may be considered as sensitive for a program. Public data of the system may be excluded from data considered as sensitive: global arrays and JCRE Entry Point Objects. Indeed, although references to these data may only be obtained under particular circumstances (for example, a return from a routine call), access to these data is open to all. In practice, the sensitive data may even be reduced to the sole data explicitly declared as shareable, i.e., objects which are instances of classes which implement the "Javacard.framework.Shareable" interface, because the other data are anyhow protected by the firewall mechanism of JCVM. In this latter case, in the whole of the sensitive licit references of a package, all the references which appear in the following cases, are stored: passing of arguments of the "shareable" type when a method of the package is called, a return value of "shareable" type when the package calls a method from another package or from the system (including the return value of the "getAppletShareableInterfaceObject" method of the "Javacard.framework.JCSystem package"), reading a static field of the "shareable" type in another package and catching up an exception of the "shareable" type;

on the other hand, before any other operation which one wants to forbid, it is checked whether it deals with values which are not licit references, that the value is among the sensitive licit references which are stored for this program, or else is a valid reference on a datum which is not sensitive. It should be noted that it is absolutely necessary to also have a mechanism for checking the validity of the references (see above) in order to be protected against attacks by counterfeiting a reference to a false data descriptor. In the case of JCVM, if only shareable objects are considered as being sensitive, it is sufficient that the invoke interface instruction checks, when it is applied to an object belonging to another package, that this reference actually belongs to the set of sensitive licit references associated with the calling package.

This dynamic checking of sensitive licit references has the advantage of consuming less memory space, since less references are stored, and less execution time, since less operations are checked and that the test that they belong to the set of licit references, is faster because of its smaller size.

Representation of the Set of Licit References:

Moreover, small onboard systems such as chip cards have very little memory. It is therefore important on such systems to be able to represent the set of licit (or sensitive licit) references of a program in a compact way while allowing fast dynamic checking.

The most direct method for representing the set of licit (or sensitive licit) of a program is to use a table. When introducing into the program a reference by a licit means, it is added in the table if it is not already present therein. Checking that a reference is licit is performed by successive examination of the entries in the table.

Other standard algorithmic ways for representing sets may also be used: lists, trees, etc. Certain representations of the sets notably enable optimization of the operations for adding, suppressing and testing the presence of an element in a set when the maximum (or likely maximum) number of elements. The set may then actually be dimensioned according to this maximum number and more or less direct accesses may be made to the elements.

Cleaning the Set of Licit References:

On the other hand, one should make sure that the licit (or sensitive licit) stored references are consistent in the case of suppression of data.

Indeed, during execution, data which have become unnecessary or inaccessible may be suppressed from the memory of the system or from a program. A datum becomes inaccessible as soon as the program no longer contains any active reference on this datum, i.e., even capable of being subsequently used by the program during its execution. Such data may be explicitly deleted by calling a memory freeing routine, or automatically by a "garbage collector".

If a reference becomes inactive in a program, the set of licit (or sensitive licit) stored references remains compatible with the security of the system: anyhow, the program is free to use the references which it has, or not, and it is possible to control that all those which it uses are actually licit. Such a set may however be cleared of inactive references, in order to reduce its size in memory. This clearing becomes even urgent when the data allocator may create a new datum associated with a reference for which the datum was suppressed.

The cleaning of the set of licit (or sensitive licit) references may be carried out by a garbage collector automatically. For this, it should browse through all the values present in the program being executed in order to determine the references which are still active. All the references encountered during this browsing are marked as "being still in service" in the set of licit references of the program. At the end of this browsing, all the non-marked entries may be freed: they correspond to data which the program was able to access in the past, but on which no reference (or no usable reference) was kept.

In the case when data may thereby be deleted, it is not necessary to dimension the set of licit references according to the number of data referenced in the system: it may be sub-dimensioned and regularly be rid of the elements which are no longer useful, for example when the set is full. Thus, it is sufficient to dimension the set of licit references of a program to the number of simultaneously active references during its execution, a number which is smaller than the number of referenced data in the system.

Moreover, in the case when one does not know how to decide with certainty if a value either represents or not a reference, which is the case in a runtime system (including a virtual machine) which does not keep all the information of type, one may resort to a so-called "conservative" garbage collector. With such a garbage collector, any value capable of being a reference (for example an integer) is considered as such by security. This garbage collector is said to be conservative because the values wrongly assumed to be references prevent the clearing of these references; on the other hand, one is sure that no reference can be suppressed as long as it is still active.

Representation of the Licit References by Filtering Tables of Handles:

Finally, when the references are represented by handles, to which correspond indexes associated with one or more tables of pointers (or of references) managed by the system, the set of licit (or sensitive licit) references of a program may be represented in a more compact way.

For this, vectors of bits of the same size as the tables of pointers may be used. These vectors are interpreted as filters on tables of pointers (or references) in order to indicate the relevant references as present in the set: a raised (equal to 1) or not raised (equal to 0) bit at a given index indicates that the corresponding reference should be either considered or not in the set of licit (or sensitive licit) references of the program. Adding, suppressing and testing the presence of an element in the set, is extremely fast as there is only one bit to position or to test. By assigning numbers of programs, these vectors of bits may also be grouped in a matrix of bits, one of the coordinates of which is indexed by the number of the program.

If there are many references in the system and that a very little amount of them is to be considered as licit (or sensitive licit) for each of the program, this matrix of bits may finally prove to be less compact than a representation by a simple table of explicit references. In this case, it is possible to try to use a representation as a hollow vector (or a hollow matrix), for example a sequence of indexes or of lengths corresponding to the extents of bits positioned in the same way (either 1, or 0).

Different tables may also be utilized in order to store the handles which are licit (or sensitive licit) references on the one hand, and the other references on the other hand. The vectors of bits thus-become much less long and much more dense.

The invention claimed is:

1. A method for controlling access to data handled by references in a system for executing programs, said programs including processes and tasks, wherein upon executing a program, the method comprises the following steps:
 having the system store an entire set of licit references which the program obtains by means considered as licit, wherein a reference identifies at least one a pointer or data of the program, the data including structures, objects, and tables, said licit reference being stored when introducing into the program said reference by a licit means and when this licit reference is not already stored, wherein a reference is considered to be licit when that reference was obtained in a manner permissible in accordance with a system, context and program being used, and a reference is considered not licit when that reference was not obtained in a manner permissible in accordance with the system, context and program being used;
 before any operation intended to be forbidden in case said operation deals with values which are not licit references, having the system check that said values are among the licit references which have been stored for this program, and
 accepting the operation, responsive to said step of checking, when said checking determines said values are among the licit references, and rejecting the operation responsive to said step of checking, when said checking determines said values are not among the licit references.

2. The method according to claim 1, wherein the references are pointers.

3. The method according to claim 1, wherein the licit means for a program in order to obtain reference values comprise at least one of the following operations:
 reading a variable or a datum belonging to the system or to another program,
 writing into a variable or datum of said program by the system or by another program,
 receiving arguments upon calling a routine of said program by the system or by another program,
 utilization of the return value from the call by said program of a routine belonging to the system or to another program,
 having said program catch up a raised exception during execution of a routine belonging to the system or to another program,
 receiving by said program an interruption or a valuated signal.

4. The method according to claim 1, wherein the system comprises a mechanism which determines whether a given value is a valid reference.

5. The method according to claim 4, wherein the system comprises a firewall which forbids certain programs on certain referenced data, data considered as being sensitive for the system being those for which the operations are not forbidden by the firewall.

6. The method according to claim 5, wherein the firewall forbids certain operations by a program on data belonging to other programs, except on those declared as shareable.

7. The method according to claim 6, wherein the system is based on a Java Card virtual machine and wherein:
 a program consists of the whole of the code which is found in a "Java Card package";
 the firewall is that of the Java Card Runtime Environment (JCRE);
 the data declared as shareable and therefore sensitive, are objects which are instances of classes which implement the "Javacard.framework.Shareable" interface.

8. The method according to claim 7, wherein the system stores in sets of sensitive licit references associated with a package all the references which appear in the following cases:
 receiving arguments of "Javacard.framework.Shareable" type when a method of said package is called by another package or by the system,
 "Javacard.framework.Shareable" type return value when said package calls a method from another package or from the system (including a "getAppletShareableInterfaceObject" method of "Javacard.framework.JCSystem package"),
 reading a public static field of "Javacard.framework.Shareable" type in another package or in the system,
 catching up an instance object of a class from (inheriting from) "java.lang.Throwable" and implementing "Javacard.framework.Shareable".

9. The method according to claim 1, wherein the whole of the licit stored references is represented by a table.

10. The method according to claim 1, wherein the set of the licit stored references is emptied, by means of a conservative garbage collector, of references which have become inactive.

11. The method according to claim 1, wherein:
 the references are represented in the system by handles and tables of pointers,
 the sets of licit stored references are represented by vectors of bits associated with some of the tables of pointers, where a bit has a given index which represents the presence or the absence of the corresponding reference in said sets,
 said vectors of bits are represented by means of a sequence of indexes or lengths corresponding to the extents of bits positioned in the same way.

12. The method according to claim 1, wherein the references are handles.

13. The method according to claim 1, wherein the stored licit references are limited to the sole references on data considered as sensitive for the system.

14. The method according to claim 1, wherein said checks check that the values are among the sensitive licit references which were stored for this program or else which are references determined as valid and dealing with data which are not sensitive.

15. The method according to claim 7, wherein the data declared as shareable and therefore sensitive, are objects with public use of the system: global arrays and Entry Point Objects of JCRE.

16. The method according to claim 11, wherein said vectors of bits are hollow.

17. The method according to claim 11, wherein some of the tables of pointers are reserved for licit references.

* * * * *